(12) United States Patent
Shibayama

(10) Patent No.: US 6,600,932 B1
(45) Date of Patent: Jul. 29, 2003

(54) SYSTEM TERMINAL FOR A WIRELESS LOCAL LOOP

(75) Inventor: Hiroaki Shibayama, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/408,181

(22) Filed: Sep. 29, 1999

(30) Foreign Application Priority Data

Sep. 29, 1998 (JP) .......................................... 10-274893

(51) Int. Cl.[7] .............................................. H04M 11/00
(52) U.S. Cl. ..................................... 455/554; 455/557
(58) Field of Search ................................ 455/424, 425, 455/401, 557, 554, 550, 355; 379/418, 168

(56) References Cited

U.S. PATENT DOCUMENTS

| | | | | |
|---|---|---|---|---|
| 3,679,837 A | * | 7/1972 | Liberman ................... 379/168 |
| 4,736,361 A | * | 4/1988 | Cooperman et al. ........ 370/384 |
| 5,048,073 A | * | 9/1991 | Weiser et al. ............... 455/557 |
| 5,058,151 A | * | 10/1991 | Tanaka et al. .............. 455/462 |
| 5,134,645 A | * | 7/1992 | Berken et al. .............. 455/456 |
| 5,146,490 A | * | 9/1992 | Beckman ................ 379/112.01 |
| 5,197,096 A | | 3/1993 | Sakuma et al. ............. 379/211 |
| 5,206,901 A | * | 4/1993 | Harlow et al. .............. 379/211 |
| 5,577,114 A | | 11/1996 | Morita et al. ............... 379/385 |
| 5,588,045 A | * | 12/1996 | Locke ......................... 379/67 |
| 5,627,833 A | * | 5/1997 | Bliven ........................ 370/364 |
| 5,790,638 A | * | 8/1998 | Bertacchi ................. 379/88.26 |
| 5,898,756 A | * | 4/1999 | Manning et al. .............. 379/31 |
| 5,915,014 A | * | 6/1999 | Kakizawa ................... 379/377 |
| 5,963,639 A | * | 10/1999 | Kanamaki ................... 379/418 |
| 5,966,373 A | * | 10/1999 | Stephenson et al. ........ 370/335 |
| 5,970,415 A | * | 10/1999 | Sarpola et al. .............. 455/464 |
| 5,978,470 A | * | 11/1999 | Shaffer et al. .............. 379/377 |
| 6,104,909 A | * | 8/2000 | Baldwin et al. ............. 455/5.1 |

FOREIGN PATENT DOCUMENTS

| | | |
|---|---|---|
| JP | 9-507625 | 7/1997 |
| JP | 9-510337 | 10/1997 |
| JP | 9-322254 | 12/1997 |
| JP | 9-326869 | 12/1997 |

* cited by examiner

Primary Examiner—Dwayne Bost
Assistant Examiner—Joy K. Contee
(74) Attorney, Agent, or Firm—Sughrue Mion, PLLC

(57) ABSTRACT

A system terminal for a wireless local loop is connected to a plurality of telephones and connected to a base station for the loop by a radio channel. An open circuit detection circuit detects one of the telephones which is off-hooked, and interrupts a CPU (Central Processing Unit). A two-wire selector connects the off-hooked telephone to an interface. The system terminal therefore allows a plurality of telephones to be selectively used with a single interface, i.e., without resorting to a plurality of two-wire conversion LSIs (Large Scale Integrated circuits).

5 Claims, 8 Drawing Sheets

Fig. 4A
TEL-DET:

| - | - | - | TEL-5 DET | TEL-4 DET | TEL-3 DET | TEL-2 DET | TEL-1 DET |
|---|---|---|---|---|---|---|---|

UPDATING AND DISPLAYING OPER CIRCUIT STATES IN REAL TIME.
    1=OPEN CIRCUIT
    0=CLOSED CIRCUIT

Fig. 4B
TEL-ON/OFF:

| - | - | - | TEL-5 DET | TEL-4 DET | TEL-3 DET | TEL-2 DET | TEL-1 DET |
|---|---|---|---|---|---|---|---|

UPDATING AND DISPLAYING ON-HOOK/OFF-HOOK STATES IN REAL TIME; CHATTERING ABSORBING TIMES IN DETTIME x.
    1=OPER CIRCUIT
    0=CLOSED CIRCUIT

Fig. 4C
DETTIME1:

| DET TIME 1-7 | DET TIME 1-6 | DET TIME 1-5 | DET TIME 1-4 | DET TIME 1-3 | DET TIME 1-2 | DET TIME 1-1 | DET TIME 1-0 |
|---|---|---|---|---|---|---|---|

CHATTERING ABSORBING TIMES SET FOR UPDATING ON-HOOK/OFF-HOOK STATES IN REAL TIME.
    1=msec/bit

Fig. 4D
DETTIME2:

| DET TIME 2-7 | DET TIME 2-6 | DET TIME 2-5 | DET TIME 2-4 | DET TIME 2-3 | DET TIME 2-2 | DET TIME 2-1 | DET TIME 2-0 |
|---|---|---|---|---|---|---|---|

CHATTERING ABSORBING TIMES SET FOR UPDATING ON-HOOK/OFF-HOOK STATES IN REAL TIME.
    1=msec/bit

⋮

Fig. 4E
DETTIME5:

| DET TIME 5-7 | DET TIME 5-6 | DET TIME 5-5 | DET TIME 5-4 | DET TIME 5-3 | DET TIME 5-2 | DET TIME 5-1 | DET TIME 5-0 |
|---|---|---|---|---|---|---|---|

CHATTERING ABSORBING TIMES SET FOR UPDATING ON-HOOK/OFF-HOOK STATES IN REAL TIME.
    1=msec/bit

Fig. 4F
INTDET:

| MASK DET | - | - | DET-5 INT | DET-4 INT | DET-3 INT | DET-2 INT | DET-1 INT |
|---|---|---|---|---|---|---|---|

GENERATING FOR EVERY CHANGE IN OPEN CIRCUIT STATE.
    READ: 1=INTERRUPT    WRITE: 1=ACKNOWLEDGE
           0=NO INTERRUPT           0=INVALID
MASKDET SETTING INTERRUPT PERMISSION/INHIBITION
    1=INHIBITION    0=PERMISSION

Fig. 4G
INTONOFF:

| MASK ONOFF | - | - | ONOFF 5INT | ONOFF 4INT | ONOFF 3INT | ONOFF 2INT | ONOFF 1INT |
|---|---|---|---|---|---|---|---|

GENERATION FOR EVERY CHANGE IN OPEN CIRCUIT STATE.
    READ: 1=INTERRUPT    WRITE: 1=ACKNOWLEDGE
           0=NO INTERRUPT           0=INVALID
MASKDET SETTING PERMISSION/INHIBITION
    1=INHIBITION    0=PERMISSION

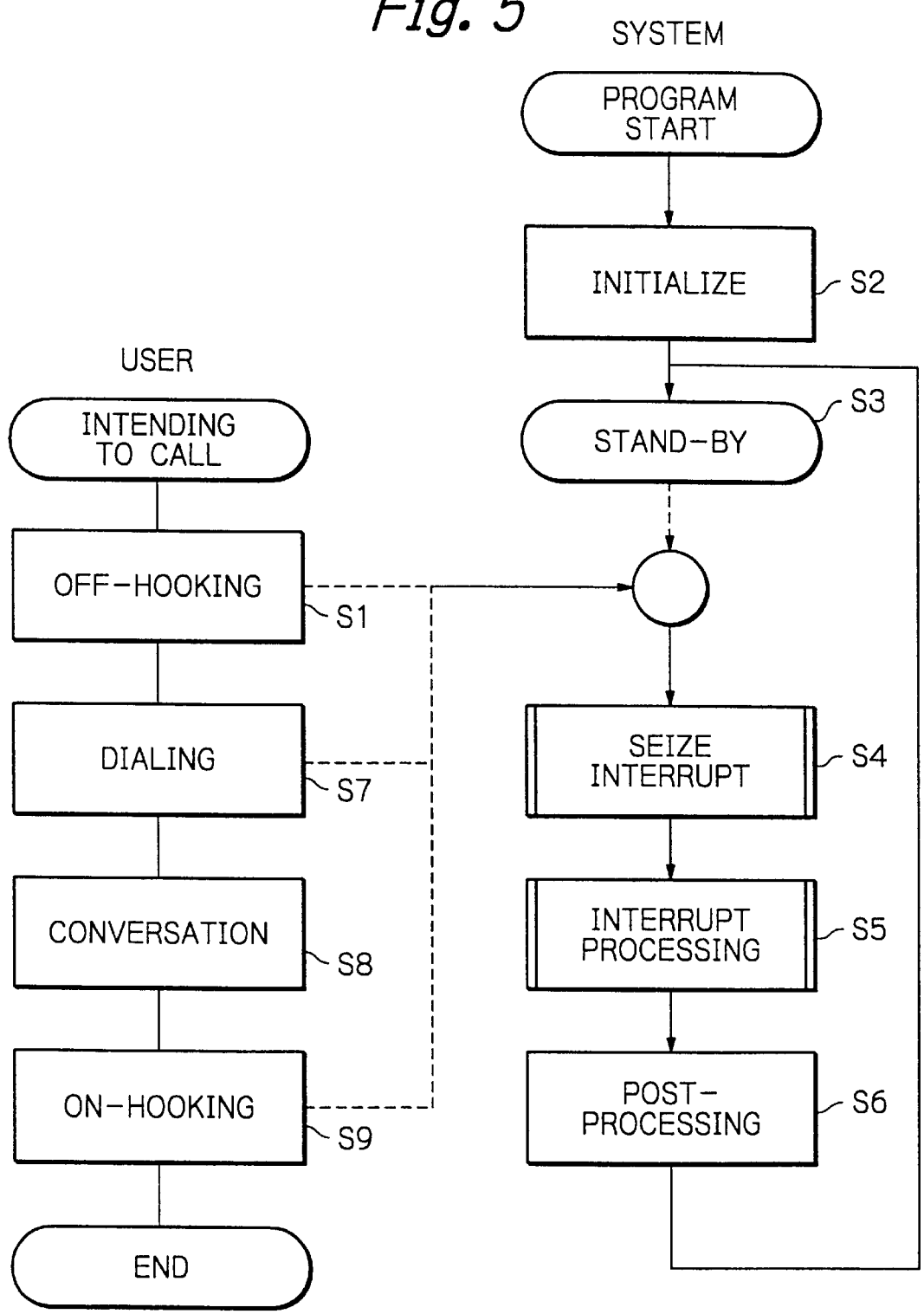

SYSTEM TERMINAL FOR A WIRELESS LOCAL LOOP

BACKGROUND OF THE INVENTION

The present invention relates to a system terminal for a local loop and more particularly to a system terminal for a local loop connected to a plurality of telephones and connected to a base station for the loop by a radio channel.

One of conventional system terminals for a wireless local loop includes a radio section, a PHS protocol decoding/encoding and, speech generation/speech bus control section, a CPU (Central Processing Unit), and an SLIC (Subscriber Line Interface Circuit). A plurality of telephones each are connected to the system terminal by a respective connection line. The system terminal having the SLIC shared by a:plurality of telephones is lower in cost than a system terminal having a plurality of SLICs each being assigned to a particular telephone.

However, a deficiency of the above conventional system terminal is that it cannot control the telephones individually or allow them to communicate with each other.

Technologies relating to the present invention are disclosed in, e.g., Japanese Patent Laid-Open Publication Nos. 9-322254 and 9-326869 and Japanese Published PCT Application Nos. 9-507625 and 9-510337.

SUMMARY OF THE INVENTION

It is therefore an object of the present invention to provide a system terminal for a wireless local loop capable of controlling telephones connected thereto individually with a simple construction.

A system terminal for a wireless local loop connected to a plurality of telephones and connected to a base station for the loop by a radio channel of the present invention includes an open circuit detection circuit for detecting an open circuit state and an on-hook/off-hook state between the system terminal and the individual telephone, and storing the results of detection. A radio section is connected to the radio channel. An encoder/decoder selectively encodes a speech channel to be input to the radio section or decodes a speech signal received via the radio section. A single interface interfaces the plurality of telephones and the encoder/decoder. A two-wire selector connects one of the plurality of telephones to the single interface at a time. A CPU controls the two-wire selector. An interrupt controller interrupts the CPU in accordance with states detected by the open circuit detection circuit.

BRIEF DESCRIPTION OF THE DRAWINGS

The above and other objects, features and advantages of the present invention will become more apparent from the following detailed description taken with the accompanying drawings in which:

FIGS. 4A–4G each shows a particular exclusive register mapped in the custom LSI of FIG. 3;

FIG. 5 is a flowchart demonstrating control to be executed in the illustrative embodiment

DESCRIPTION OF THE PREFERRED EMBODIMENT

Figure 1:
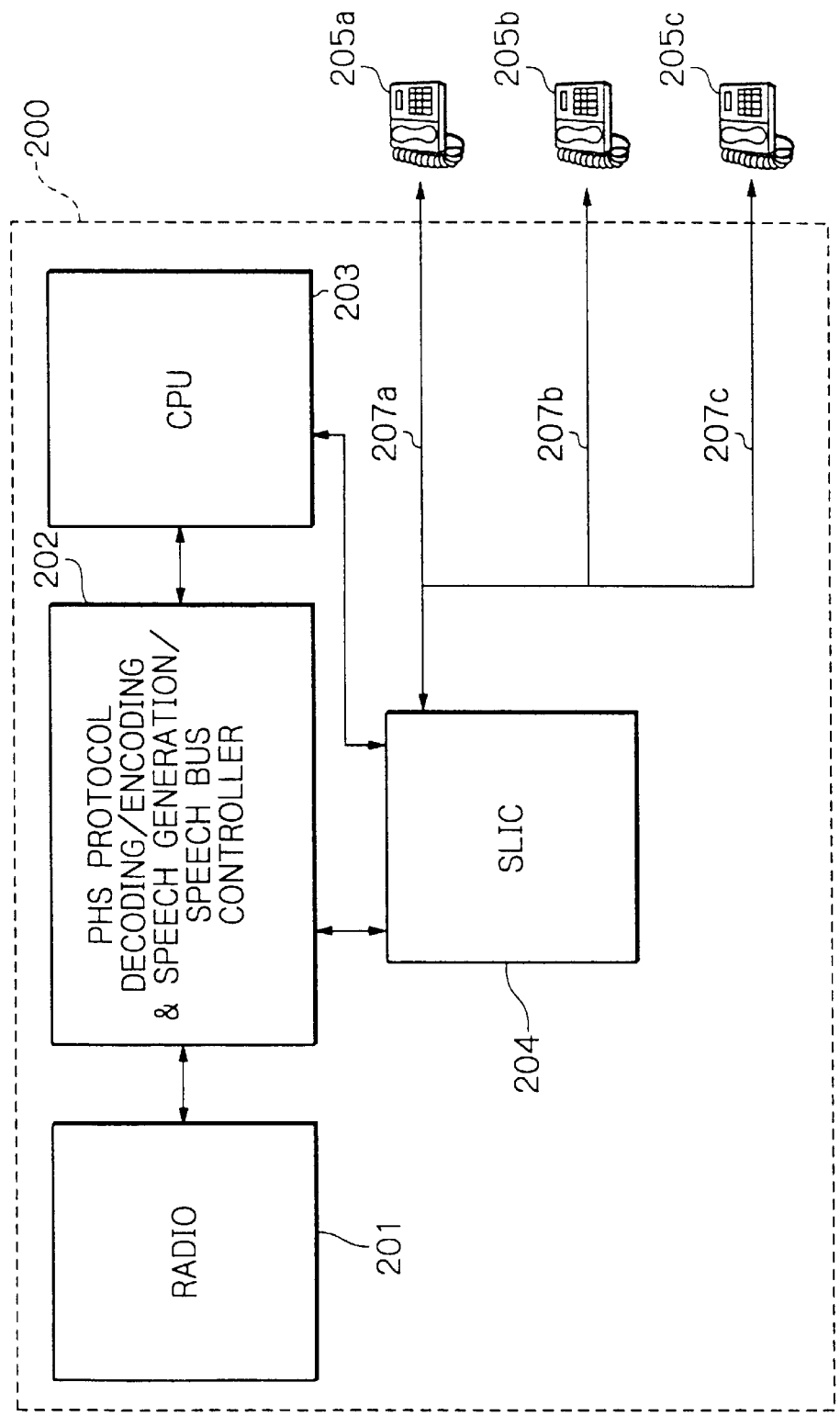
FIG. 1 is a block diagram schematically showing a conventional system terminal for a wireless local loop.

To better understand the present invention, brief reference will be made to a conventional system terminal for a wireless local loop, shown in FIG. 1. As shown, the system terminal, generally 200, includes a radio 201, a PHS (Personal Handyphone System) protocol decoding/encoding and speech generation/speech bus control 202, a CPU 203, and an SLIC 204. A plurality of telephones 205a, 205b and 205c each are connected to the system terminal 200 by a respective connection line 207a, 207b or 207c.

The radio 201 is connected to a base station, not shown, by a radio channel. The CPU 203 controls the PHS protocol decoding/encoding and speech generation/speech bus control 202, and SLIC 204. When any one of the telephones 205a–205c is off-hooked, the SLIC 204 detects it and interrupts the CPU 203. In response, the CPU 203 sets up a bus between the off-hooked telephone and the control 202. In this condition, a call meant for a desired destination can be originated on the above telephone.

The radio 201 receives a call incoming from a remote station. The PHS protocol decoding/encoding and speech generation/speech bus control 202 detects the call incoming and reports it to the CPU 203. In response, the CPU 203 sets up a bus between the control 202 and one of the telephones 205a–205c for which the call is meant.

The above system terminal having the SLIC 204 shared by a plurality of telephones 205a–205c is lower in cost than a system terminal having a plurality of SLICs each being assigned to a particular telephone. However, the system terminal shown in FIG. 1 cannot control the telephones 205a–205c individually or allow the telephones 205a–205c to communicate with each other, as stated earlier.

Figure 2:
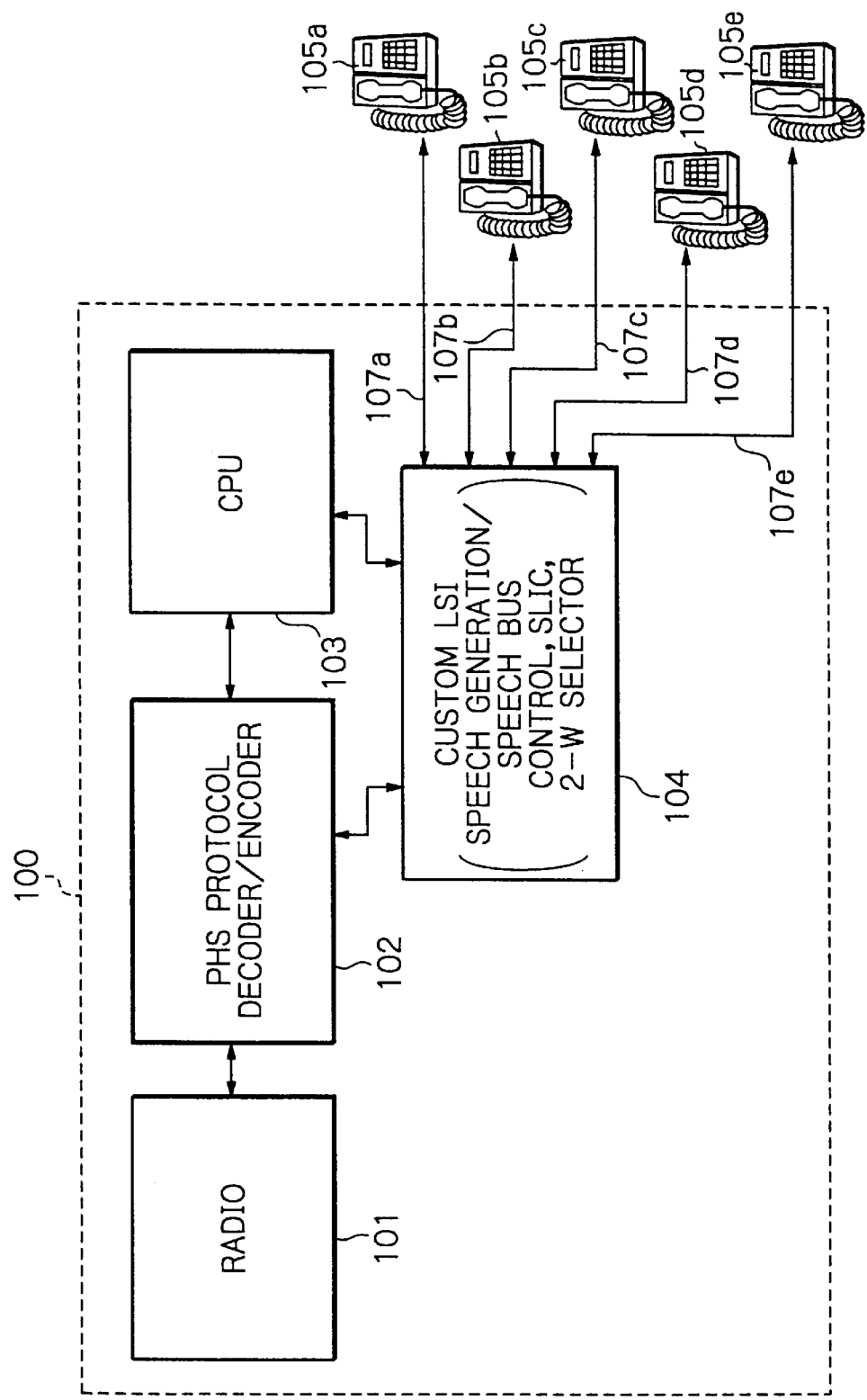
FIG. 2 is a schematic block diagram showing a system terminal for a wireless local loop embodying the present invention.

Referring to FIG. 2, a system terminal for a wireless local loop embodying the present invention is shown and generally designated by the reference numeral 100. The system terminal 100 is of the type prescribed by a standard STD-28 prescribed by the Association of Radio Industries of Japan. As shown, the system terminal 100 includes a radio 101, a PHS protocol decoding/encoding 102, a CPU 103, and a custom LSI 104. A plurality of (five in the illustrative embodiments) of telephones 105a, 105b, 105c, 105d and 105e each are connected to the custom LSI 104 by respective one of connection lines 107a, 107b, 107c, 107d and 107e.

The radio 101 is connected to a base station, not shown, by a radio channel. The CPU 103 controls the PHS protocol decoding/encoding 102 and custom LSI 104. The custom LSI 104 includes a speech generation/speech bus controller, an SLIC, and a two-wire (2W) selector, as will be described specifically later. The illustrative embodiment is characterized in that the custom LSI 104 includes the two-wire selector for controlling the telephones 105a–105e individually with a simple configuration.

It should be noted that the above simple configuration is not directed toward a decrease in production cost, but toward the user's minimum demand for the low-cost connection of two or more telephones at home. The two-wire selector included in the custom LSI 104 is capable of selecting one of different speeches and one of different ringer tones and service tones as well as one of different paths including an open circuit detection circuit which will be described later.

Figure 3:
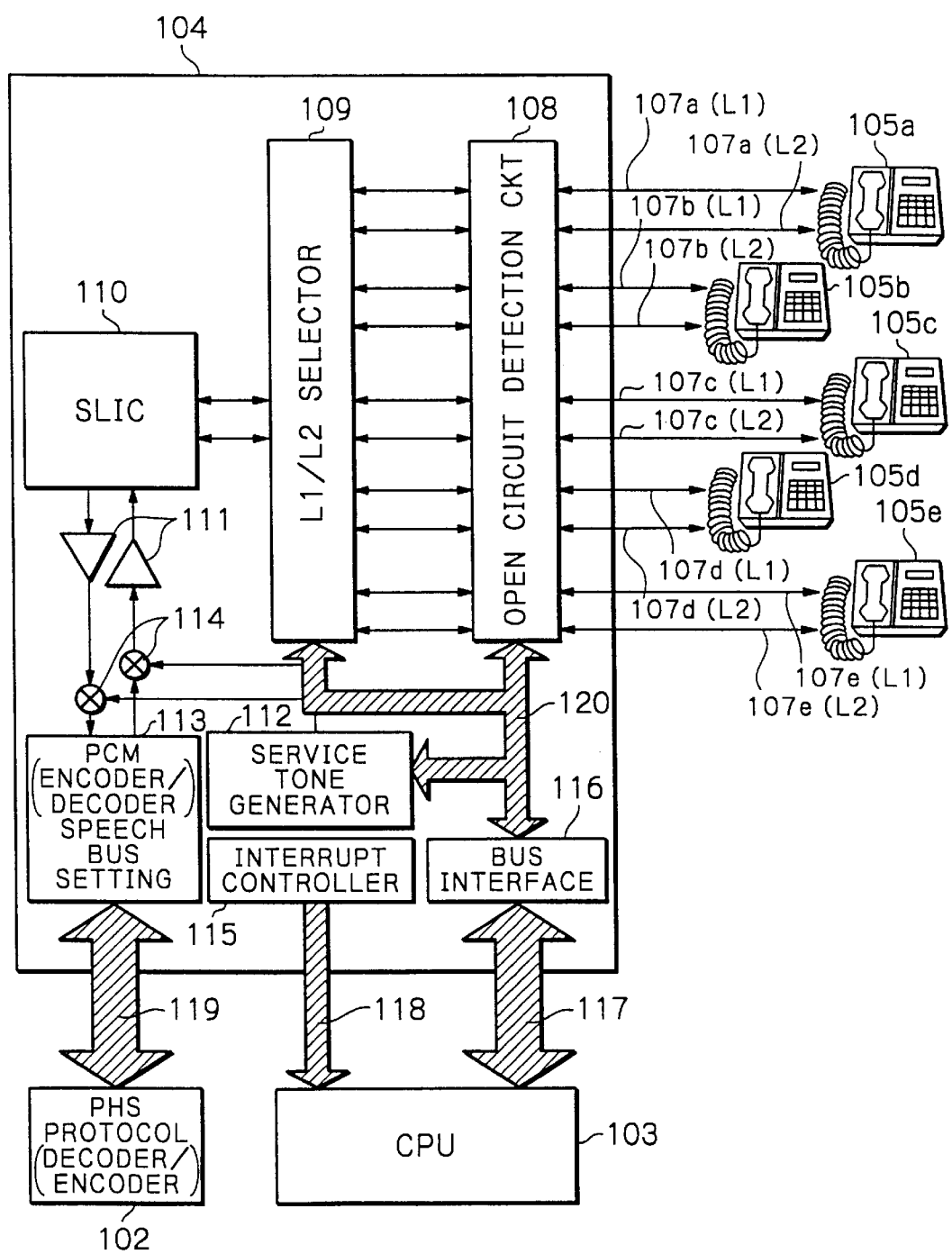
FIG. 3 is a schematic block diagram showing a specific configuration of a custom LSI (Large Scale Integrated circuit) included in the illustrative embodiment.

FIG. 3 shows a specific configuration of the custom LSI 104. As shown, the custom LSI 104 includes an open circuit detection circuit 108, an L1/L2 (or 2W) selector 109, an SLIC 110, impedance matching devices 111, a service tone generator 112, a PCM (Pulse Code Modulation) (encoder/ decoder) speech bus setting 113, mixers 114, an interrupt controller 115, a bus interface 116, and a connection line 120. The custom LSI 104 is connected to the CPU 103, FIG. 2, by a bus 117 and a control line 118 and connected to the PHS protocol decoder/encoder 102, FIG. 2, by a bidirectional control line 119. The interrupt controller 115 is connected to the above blocks although not shown specifically. The telephones 105a–105e are respectively connected to the open-circuit detection circuit 108 by the connection lines 107a-107e.

FIGS. 4A–4G show various registers mapped in the memory space of the CPU 103. Specifically, FIG. 4A shows a register TEL-DET i included in the open circuit detection circuit 108 for updating and displaying open circuit states in real time. FIG. 4B shows a register TEL-ON/OFF for updating and displaying on-hook/off-hook states in real time. FIGS. 4C, 4D and 4E show five different kinds of registers DETTIME1–DETTIME5 for setting chattering absorbing times used to update the on-hook/off-hook states in real time. FIG. 4F shows a register INTDET for setting, everytime any open circuit state changes, the presence/absence of an interrupt and the presence/absence of an acknowledgement. FIG. 4G shows a register INTONOFF for setting whether or not an interrupting function is permitted or inhibited.

Reference will be made to FIGS. 5–8 for describing a specific operation of the system terminal 100. As shown in FIG. 5, assume that the user of any one of the telephones 105a–105e off-hooks the telephone with the intention of calling a remote station (step S1). In response, among the connection lines 107a-107e, the connection line connected to the off-hooked telephone causes a waveform on its lines L1 and L2 to go low. As a result, the open circuit detection circuit 108 of the custom LSI 104 detects an open-circuit state and delivers a detection signal to the bus interface 116 via the connection line 120 and to the interrupt controller 115. In response, the interrupt controller 115 interrupts the CPU 103.

As also shown in FIG. 5, before the above user off-hooks the telephone, the CPU 103 is initialized at the time system start-up, i.e., program start-up (step S2) and remains in a stand-by state (step S3). In this condition, the CPU 103 is interrupted by the interrupt controller 115, as stated above, and seizes the interrupt (step S4).

Figure 6:
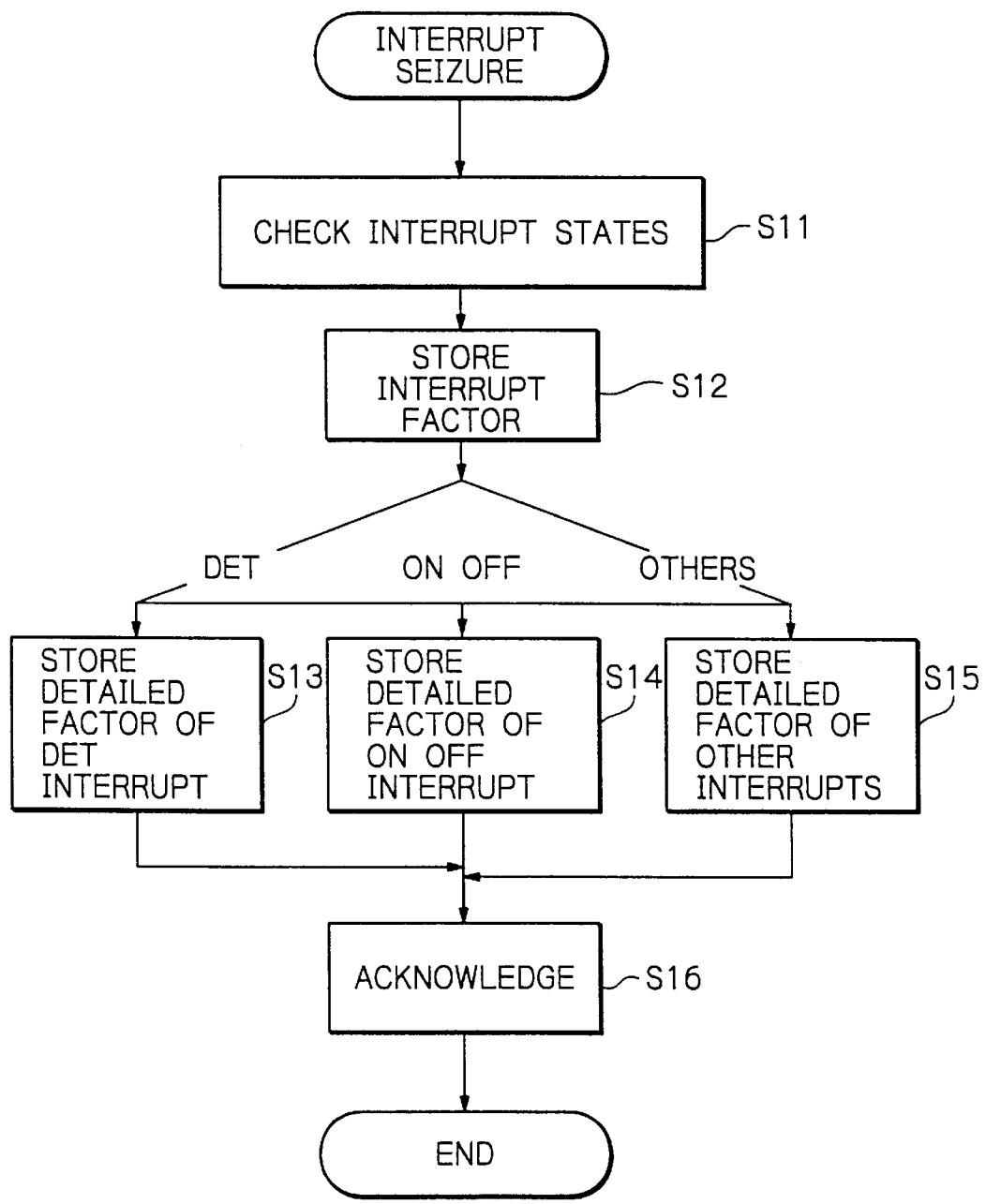
FIGS. 6 and 7 are flowcharts respectively showing interrupt seizure processing and interrupt processing included in the control of FIG. 5.
Figure 7:
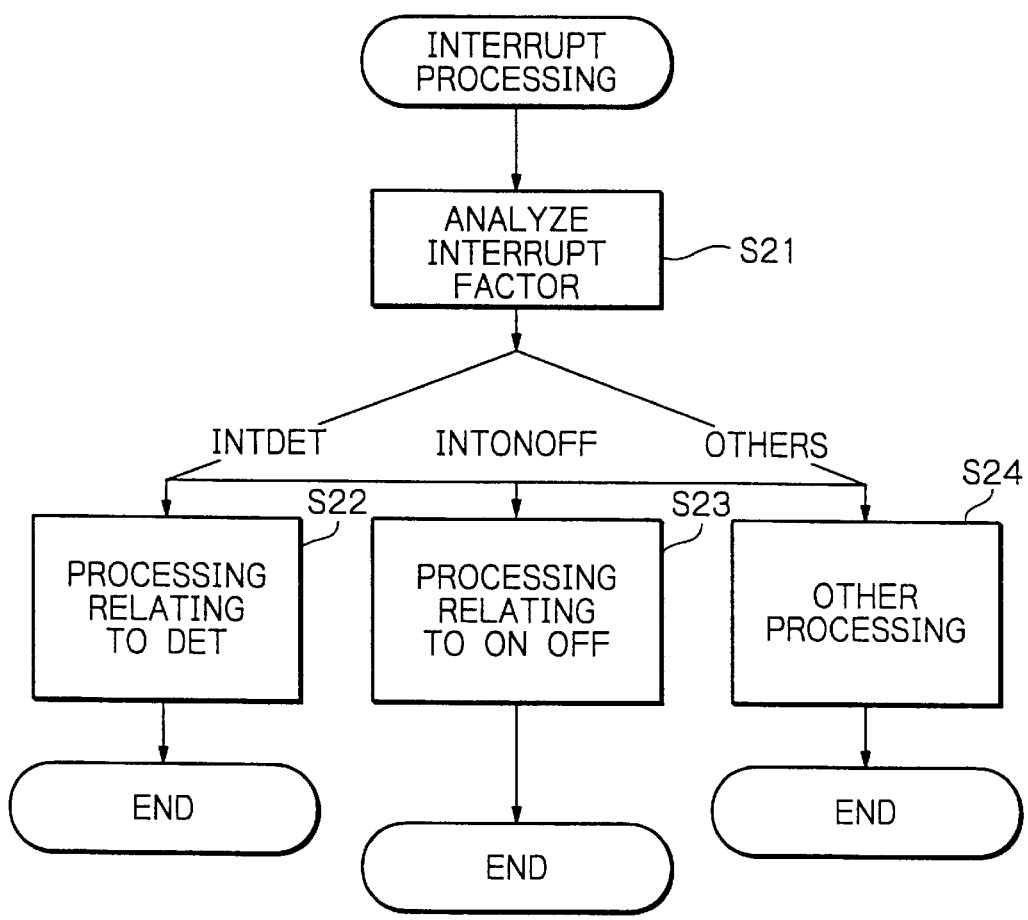

More specifically, as shown in FIG. 6, the CPU 103 checks an interrupt status (step S11) and then stores an interrupt factor (step S12). The exclusive registers shown in FIGS. 4A–4G and included in the open circuit detection 108 are mapped in the CPU 103, as stated earlier. This, coupled with the fact that the bus interface 116 reports the above change in state to the CPU 103 via the bus 117, allows the CPU 103 to see the change in status without resorting to the conventional serial bus or exclusive processing.

The registers DETTIME1–DETTIME5 shown in FIGS. 4C–4E are respectively assigned to the five telephones 105a–105e, and each sets a particular chattering absorbing time for updating the on-hook/off-hook state of the associated telephone in real time. The register TEL-DET shown in FIG. 4A updates and displays the open circuit state of each of the telephones 105a–105e in real time. The register TEL-ON/OFF shown in FIG. 4B updates and displays the on-hook/off-hook state of each of the telephones 105a–105e in real time. Further, the registers INTDET and INTONOFF shown in FIGS. 4F and 4G are used to set the permission/inhibition of an interrupt request and see an interrupt factor.

In the illustrative embodiment, if a ZERO (permission) is set in a bit MASK DET included in the register INTDET, FIG. 4F, then the CPU 103 can see an interrupt factor of DETxINT. For example, when the telephone 105a is off-hooked, a value representative of the occurrence of an interrupt is set in a bit DET1INT of the register INTDET. The CPU 103 can recognize the above value set in DET1INT and execute the next processing.

Figure 8:
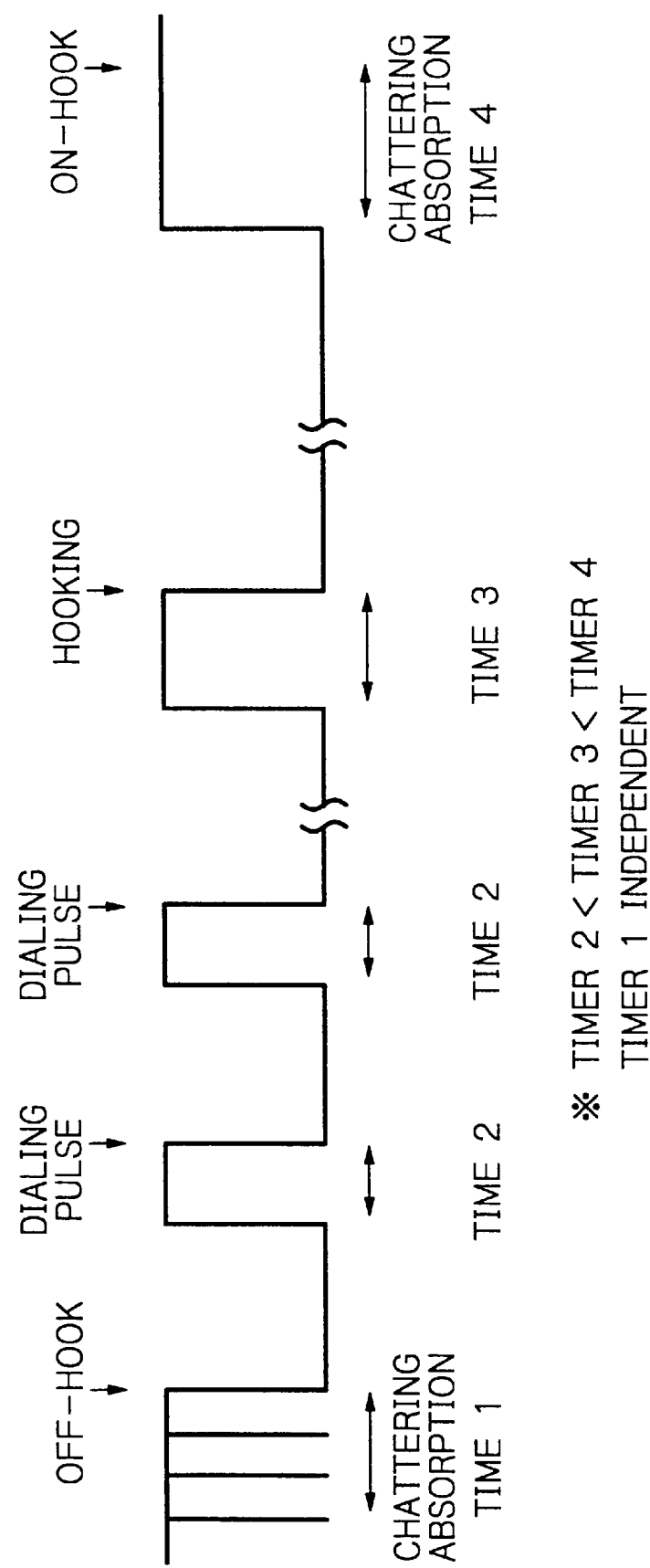
FIG. 8 shows a waveform for describing a specific operation of the illustrative embodiment.

Further, the CPU 103 detects a bit of the register TEL-ON/OFF, FIG. 4B, where a ONE has been set for more than a chattering absorbing time determined by associated one of the registers DETTIME1–DETTIME5 (timer 1, FIG. 8). For example, when the telephone 105a is off-hooked, a ONE is set in a bit TEL-1DET of the register TEL-ON/OFF for the chattering absorbing time set in the timer 1. This allows the CPU 103 to determine that the telephone 105a is off-hooked.

The CPU 103 determines whether the interrupt relates to DET, whether it relates to ON/OFF or whether it relates to any other factor. The CPU 103 writes such different factors in the exclusive registers (steps S13–S15) and then returns an acknowledgement (step S16).

As shown in FIG. 5, after the step S4, the CPU 103 executes interrupt processing (step S5). The step S5, like the step S4, is conventional. As briefly shown in FIG. 7, the CPU 103 analyzes the interrupt factor (step S21) and then executes processing matching with the interrupt factor (steps S22–S24).

The above steps S4 and S5 are not directly relevant to the understanding of the illustrative embodiment and will not be described in detail. A particular speech bus is assigned to each of the telephones 105a–105e up to the SLIC 110. It is therefore possible for the service tone generator 112 to generate a service tone for any one of the telephones other than the off-hooked telephone. In addition, the CPU 103 recognized the open circuit state can connect the bus to a desired telephone by controlling the L1/L2 selector 109.

After the step S5, the CPU 103 executes post-processing (step S6) and then returns to the step S3. On the other hand, the user that off-hooked the telephone dials it (step S7) and then holds conversation in the conventional manner (step S8). At this instant, to locate the telephone outputting a dial pulse, the CPU 103 detects a bit of the register TEL-DET received from the open circuit detection-circuit 108 via the bus interface 116 and representing an open circuit state for a preselected period of time (timer 2, FIG. 8).

It is to be noted that the CPU 103 determines which telephone has been hooked on the basis of a bit of the register TEL-DET of the open circuit detection circuit 108 representing an open circuit state for more than the period of time set in the timer 2 (timer 3, FIG. 8). The CPU 103 monitors the timers 2 and 3 with software stored therein.

During conversation, a speech signal input on the off-hook telephone is sent to the destination via the open circuit detection 108, L1/L2 selector 109, SLIC 110, one impedance matching device 111, one mixer 114, PCM speech bus setting 113, control line 119, and PHS protocol 102. A speech signal received from the destination is routed through a path opposite to the above path and sent to the off-hook telephone. On ending the conversation, the user on-hooks the telephone (step S9, FIG. 5).

The CPU 103 locates the off-hooked telephone on the basis of a bit of the register TEL-DET of the open circuit detection circuit 108 fed from the open circuit detection circuit 108 via the bus interface 116 and representing an open circuit state for a period of time longer than the period of time set in the timer 3 (timer 4, FIG. 8).

The open circuit detection circuit 108 determines whether the connection lines 107a–107e each are in an open circuit state or a closed circuit state, and the duration of the open circuit state or that of the closed circuit state. The interrupt controller 115 identifies.the output of the open circuit detection circuit 108 as a status representative of an interrupt. The CPU 103 processes the interrupt in the sequence described with reference to FIGS. 6 and 7.

Basically, an on-hook state and an off-hook state are also detected by using the open circuit detection circuit 108. However, to identify such states, each country uses particular definition. In light of this, chattering absorbing circuitry is built in the open circuit detection 108.

By the above procedure, a path to the SLIC is set up and a lows conversation to be held. As for the on-hook and off-hook states, DET detection has a particular prescribed width. Specifically, preselected periods of time are set in the timers T1 and T4 by initialization which differs from one country to another. Because such periods of time absorb chattering, on-hook and off-hook each can be detected during DET detection effected for a preselected period of time.

At the time of call incoming from a remote terminal, the L1/L2 selection 109 causes all of the telephones 105a–105e to output a ringer tone. When the user of any one of the telephones 105a–105e outputting the ringer tone off-hooks the telephone, the open circuit detection circuit 108 and CPU 103 cooperate to identify the off-hooked telephone. Then, the L1/L2 selector 109 connects the off-hooked telephone to the remote terminal in the same manner as at the time of call origination. The illustrative embodiment is therefore capable of selectively connecting the five telephones 105a–10e with a single SLIC 110 which is expensive.

In summary, it will be seen that the present invention provides a system terminal for a wireless local loop having various unprecedented advantages, as enumerated below.

(1) An open circuit detection circuit detects one of a plurality of telephones which is off-hooked, and interrupts a CPU. A two-wire selector connects the off-hooked telephone to an interface. The system terminal therefore al lows a plurality of telephones to be selectively used with a single interface, i.e., without resorting to a plurality of two-wire conversion LSIs.

(2) The system terminal needs only a single interface called SLIC. Therefore, only a single PCM (encoder/decoder) for communication processing and therefore a single hardware section using a PHS protocol suffices. The system terminal is therefore far lower in cost than the conventional system terminal needing a plurality of SLICs each being assigned to a particular telephone.

(3) The open circuit detection circuit includes registers for storing an on-hook/off-hook state and an open circuit state telephone by telephone. The registers are mapped in part of the memory space of the CPU. It is therefore possible to implement data accesses with any conventional technology. This obviates the need for special control and enhances the efficient performance of a program Various modifications will become possible for those skilled in the art after receiving the teachings of the present disclosure without departing from the scope thereof.

What is claimed is:

1. A system terminal for a wireless local loop connected to a plurality of telephones and connected to a base station for said wireless local loop by a radio channel, said system terminal comprising:

an open circuit detection circuit for detecting an open circuit state and an on-hook/off-hook state between said system terminal and each one of the plurality of telephones, and storing results of detection for each one of the plurality of telephones, said open circuit detection circuit having a first register for setting a particular chattering absorbing time for each of the plurality of telephones for detection of the on-hook/off-hook state;

a radio section connected to the radio channel;

an encoder/decoder for selectively encoding a speech channel to be input to said radio section or decoding a speech signal received via said radio section;

a single interface interfacing the plurality of telephones and said encoder/decoder;

a two-wire selector for connecting one of the plurality of telephones to said single interface at a time;

a CPU (Central Processing Unit) for controlling said two-wire selector; and an-interrupt controller for interrupting said CPU in accordance with states detected by said open circuit detection circuit.

2. A system terminal as claimed in claim 1, wherein said open circuit detection circuit further comprises:

a second memory for storing the open circuit state detected or a closed circuit state between said open circuit detection circuit and each of said plurality of telephones;

a third memory for storing the on-hook/off-hook state of each of the plurality of telephones detected; and a fourth memory for setting a permission/inhibition of an interrupt;

said first memory to said fourth memory being mapped in a memory space of said CPU.

3. A system terminal as claimed in claim 2, wherein said CPU determines, when the open circuit state of any one of the plurality of telephones continues for more than associated one of the chattering absorbing times set in said first register, that the telephone is off-hooked, determines, when a value stored in said second register is representative of the closed circuit state for a period of time set in a first timer, a dialing pulse is output from said telephone, determines, when the closed circuit state continues for a period of time set in a second timer and longer than said period of time set in said first timer, that said telephone is hooked, and determines, when said closed circuit state continues for a period of time set in a third timer and longer than said period of time set in said second timer, that said telephone is on-hooked.

4. A system terminal as claimed in claim 1, wherein said two-wire selector causes, at a time of call incoming, the plurality of telephones to output a ringer tone simultaneously and connects, when one of said plurality of telephone terminals is off-hooked, said telephone to said single interface under a control of said CPU.

5. A system terminal for a wireless local loop connected to a plurality of telephones and connected to a base station for said wireless local loop by a radio channel, said system terminal comprising:

an open circuit detection circuit for detecting an open circuit state and an on-hook/off-hook state between said system terminal and each one of the plurality of telephones, and storing results of detection for each one of the plurality of telephones;

a radio section connected to the radio channel;

an encoder/decoder for selectively encoding a speech channel to be input to said radio section or decoding a speech signal received via said radio section;

a single interface interfacing the plurality of telephones and said encoder/decoder;

a two-wire selector for connecting one of the plurality of telephones to said single interface at a time;

a CPU (Central Processing Unit) for controlling said two-wire selector; and an interrupt controller for interrupting said CPU in accordance with states detected by said open circuit detection circuit, wherein said open circuit detection circuit, said two-wire selector, said interface and said interrupt controller are constructed into a single LSI (Large Scale Integrated circuit).

\* \* \* \* \*